United States Patent
Asahina et al.

(10) Patent No.: US 6,469,122 B1
(45) Date of Patent: Oct. 22, 2002

(54) POLYISOCYANATE AND PROCESS FOR PRODUCING THE SAME

(75) Inventors: Yoshiyuki Asahina; Jun-ichi Kanemaru, both of Nobeoka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/623,220

(22) PCT Filed: Apr. 8, 1999

(86) PCT No.: PCT/JP99/01879

§ 371 (c)(1),
(2), (4) Date: Aug. 30, 2000

(87) PCT Pub. No.: WO99/52960

PCT Pub. Date: Oct. 21, 1999

(30) Foreign Application Priority Data

Apr. 8, 1998 (JP) ............................................. 10-096277
Aug. 12, 1998 (JP) ............................................. 10-227956

(51) Int. Cl.⁷ ............................................. C08G 18/10
(52) U.S. Cl. ............................... 528/59; 528/67; 528/85
(58) Field of Search .............................. 528/85, 76, 79, 528/59, 67

(56) References Cited

U.S. PATENT DOCUMENTS

| | | |
|---|---|---|
| 4,324,879 A | 4/1982 | Bock et al. |
| 4,810,820 A | 3/1989 | Slack et al. |
| 5,641,851 A | 6/1997 | Wolff et al. |
| 5,739,251 A * | 4/1998 | Venham et al. ................ 528/49 |

FOREIGN PATENT DOCUMENTS

| | | |
|---|---|---|
| GB | 994890 | 6/1965 |
| JP | 5128680 | 8/1976 |
| JP | 5209165 A | 8/1993 |
| JP | 7304724 A | 11/1995 |
| JP | 10168155 A | 6/1998 |

* cited by examiner

*Primary Examiner*—James J. Seidleck
*Assistant Examiner*—Melanie Bissett
(74) *Attorney, Agent, or Firm*—Birch, Stewart, Kolasch & Birch, LLP

(57) ABSTRACT

Disclosed is a novel polyisocyanate which is obtained by reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3 and which has an allophanate linkage content of from 0.05 to 0.40, in terms of the ratio of the number of allophanate linkages in the polyisocyanate to the sum of the number of the allophanate linkages in the polyisodyanate and the number of urethane linkages in the polyisocyanate. The polyisocyanate of the present invention exhibits a high curing rate and a low viscosity. Further, the polyisocyanate, upon being cured, not only has no surface tack and exhibits a low modulus-in-tension property, but also exhibits a high tensile elongation property without a need for a plasticizer. Therefore, the polyisocyanate of the present invention can be advantageously used as a sealant. Also disclosed is a method for effectively and efficiently producing the polyisocyanate which, upon being cured, is improved with respect to a low modulus-in-tension property and a high tensile elongation property.

10 Claims, No Drawings

US 6,469,122 B1

POLYISOCYANATE AND PROCESS FOR PRODUCING THE SAME

This application is the national phase under 35 U.S.C. §371 of PCT International Application No. PCT/JP99/01879 which has an International filing date of Apr. 8, 1999, which designated the United States of America.

BACKGROUND OF THE INVENTION

1. Field of the Invention

The present invention relates to a novel polyisocyanate. More particularly, the present invention is concerned with a novel polyisocyanate which is obtained by reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3 and which contains allophanate linkages and urethane linkages in a specific ratio. The polyisocyanate of the present invention exhibits a high curing rate and a low viscosity. Further, the polyisocyanate, upon being cured, not only has no surface tack and exhibits a low modulus-in-tension property, but also exhibits a high tensile elongation property without a need for a plasticizer. Therefore, the polyisocyanate of the present invention can be advantageously used as a sealant. The present invention is also concerned with a sealant comprising the polyisocyanate. Moreover, the present invention is concerned with a method for effectively and efficiently producing the polyisocyanate which, upon being cured, is improved with respect to a low modulus-in-tension property and a high tensile elongation property.

2. Prior Art

A polyisocyanate is advantageous in that a cured resin obtained by curing a polyisocyanate, by utilizing the high reactivity of isocyanate groups contained therein, exhibits excellent mechanical properties, such as excellent flexibility and chemical resistance, so that a polyisocyanate is widely used for a coating material, an adhesive, a sealant, a waterproof material, a foam, an elastomer and the like. A polyisocyanate can be produced using a diisocyanate as a main raw material. Polyisocyanate-based curable resin compositions are classified into those of one-pack and two-pack types. A one-pack type curable resin composition containing a polyisocyanate is cured by moisture in the air or the like. On the other hand, in the case of a two-pack type curable resin composition containing a polyisocyanate, the polyisocyanate is mixed, just prior to use, with a polyol to cause a reaction of the isocyanate groups in the polyisocyanate with the hydroxyl groups in the polyol, thereby curing the composition.

Of polyisocyanates, a polyisocyanate produced using an aliphatic diisocyanate or an alicyclic diisocyanate as a main raw material has an advantage in that a cured resin obtained by curing the polyisocyanate has excellent weatherability. Therefore, there have hitherto been many proposals with respect to a polyisocyanate produced using an aliphatic diisocyanate or an alicyclic diisocyanate as a main raw material.

Also known is a polyisocyanate having a carbodiimide, a uretdione, an oxadiazinetrione, a biuret, a urethane, an allophanate or an isocyanurate skeleton.

Biuret polyisocyanates are disclosed in Unexamined Japanese Patent Application Laid-Open Specification No. 49-134629 (corresponding to U.S. Pat. No. 3,976,622), Examined Japanese Patent Application Publication No. 61-26778 (corresponding to U.S. Pat. No. 4,176,132), Examined Japanese Patent Application Publication No. 62-41496 (corresponding to U.S. Pat. No. 4,290,969), Unexamined Japanese Patent Application Laid-Open Specification No. 63-174961 (corresponding to U.S. Pat. No. 4,837,359), Examined Japanese Patent Application Publication No. 2-62545 (corresponding to U.S. Pat. No. 4,983,762), Examined Japanese Patent Application Publication No. 5-17222, Unexamined Japanese Patent Application Laid-Open Specification No. 8-225511 (corresponding to U.S. Pat. No. 5,641,851), and the like.

Isocyanurate polyisocyanates are disclosed in Unexamined Japanese Patent Application Laid-Open Specification No. 55-38380 (corresponding to U.S. Pat. No. 4,324,879), Unexamined Japanese Patent Application Laid-Open Specification No. 57-150677 (corresponding to U.S. Pat. No. 4,412,073), Unexamined Japanese Patent Application Laid-Open Specification No. 57-47319, Unexamined Japanese Patent Application Laid-Open Specification No. 63-57577, and the like.

Allophanate polyisocyanates are disclosed in British Patent No. 994890, Unexamined Japanese Patent Application Laid-Open Specification No. 7-304724, and the like.

Conventionally, urethane polyisocyantes have been widely used as a sealant for use in the architecture field in order to provide watertightness and airtightness. Especially, an elastic sealant using a urethane sealant has excellent physical properties, so that there has been a great increase in commercial demand for the elastic sealants.

With respect to urethane polyisocyanates for sealants used in the architecture field, reference can be made, for example, to Unexamined Japanese Patent Application Laid-Open Specification No. 3-111448, which discloses a high molecular weight urethane polyisocyanate having terminal isocyanate groups, which is obtained by reacting two different types of polypropylene glycols respectively having average molecular weights of 3,000 and 5,000 with 4,4'-diphenylmethane diisocyanate (hereinafter, frequently referred to as "MDI").

Unexamined Japanese Patent Application Laid-Open Specification No. 4-370146 discloses a high molecular weight urethane polyisocyanate having terminal isocyanate groups, which is obtained by reacting with MDI a polypropylene glycol having an average molecular weight of 3,000 and a polypropylene ether triol having an average molecular weight of 300.

Unexamined Japanese Patent Application Laid-Open Specification No. 6-080755 discloses a high molecular weight urethane polyisocyanate having terminal isocyanate groups, which is obtained by reacting with xylylene diisocyanate a polypropylene glycol having an average molecular weight of 3,000 and a polypropylene ether triol having an average molecular weight of 3,000.

Unexamined Japanese Patent Application Laid-Open Specification No. 6-256499 discloses a high molecular weight urethane polyisocyanate having terminal isocyanate groups, which is obtained by reacting with MDI a polyalkylene ether triol having an average molecular weight of 7,000 and a polyalkylene ether triol having an average molecular weight of 5,000.

Unexamined Japanese Patent Application Laid-Open Specification No. 3-215554 discloses a high molecular weight urethane polyisocyanate having terminal isocyanate groups, which is obtained by reacting with MDI a polyalkylene ether triol having an average molecular weight of 3,000.

Unexamined Japanese Patent Application Laid-Open Specification No. 5-209165 discloses a high molecular weight urethane polyisocyanate having terminal isocyanate groups, which is obtained by reacting with tolylene diisocyanate a polypropylene ether diol having an average molecular weight of 4,000 and a polypropylene ether triol having an average molecular weight of 10,000.

Examined Japanese Patent Application Publication No. 51-28680 discloses a reaction product of a high molecular weight polyisocyanate obtained from a polyhydroxyl compound having a molecular weight of from 500 to 10,000 and a polyisocyanate precursor with a monovalent polyether alcohol.

A urethane sealant for use in the architecture field is required to have a high curability by moisture and a low viscosity. It is further required that the urethane sealant should, upon being cured, not only have no surface tack, but also exhibit an excellent stain resistance, a low modulus-in-tension property and a high tensile elongation property. However, a sealant which is improved with respect to all of the above-mentioned properties has not been obtained from the conventional urethane polyisocyanate mentioned above.

In any conventional method for producing the urethane polyisocyanate mentioned above, the reaction of a polyol with a diisocyanate is performed in an hydroxyl group/diisocyanate group equivalent ratio of approximately 1/1. The polyisocyanate produced under such reaction conditions has a high molecular weight due to the formation of urethane linkages.

Generally, the use of a high molecular weight resin as a resin component for a sealant is advantageous in that a sealant containing such a high molecular weight resin as a main component, upon being cured, is improved with respect to a low modulus-in-tension property and a high tensile elongation property. However, in the case of the urethane polyisocyanate mentioned above, the polyisocyanate has a high molecular weight due to the formation of urethane linkages. Therefore, due to the intermolecular hydrogen bonds formed by the hydrogens possessed by urethane linkages, not only the viscosity of the sealant containing such a urethane polyisocyanate but also the modulus-in-tension property of the sealant after curing becomes high. Accordingly, a plasticizer is necessary for improving the mechanical properties of the sealant, which are required especially after curing.

However, the use of a plasticizer has a problem in that the plasticizer oozes out on the surface or the peripheral portion of the sealant after curing and causes a surface tack, so that dust or the like is likely to stick to the surface or the like, thus spoiling the appearance of the cured sealant. Moreover, when a coating is applied to the surface of the cured sealant, it is possible that the coating becomes too soft and weak or the applied coating is not cured due to the oozing-out plasticizer. Therefore, a special treatment, such as a post-treatment with a specific coating material, is needed after the sealant is applied.

Further, each of the polyalkylene ether polyols used for producing the urethane polyisocyanates mentioned above has the following problem. The polyalkylene ether polyols contain a small amount of monools. The monools are addition-bonded to both isocyanate groups of the diisocyanate, thereby forming unreactive (i.e., incurable), low molecular weight compounds. The unreactive compounds ooze out on the surface of the sealant after curing, and cause a surface tack.

Furthermore, the urethane polyisocyanate mentioned above has a relatively large amount of remaining diisocyanate monomers. Therefore, foams tend to be formed due to the carbon dioxide gas generated by the reaction of an isocyanate group with moisture.

In Unexamined Japanese Patent Application Laid-Open Specification No. 10-168155, the present inventors proposed a polyisocyanate containing allophanate linkages and a sealant containing the same. The method for producing this polyisocyanate comprises reacting a diisocyanate with a polyol in a diisocyanate/polyol ratio of considerably greater than 1/1 in terms of the isocyanate group/hydroxyl group equivalent ratio, so that the formation of a high molecular weight polyisocyanate due to urethane linkages is prevented.

However, even a sealant containing this polyisocyanate has the following problem. When no plasticizer is used, the sealant after curing cannot be satisfactorily improved with respect to mechanical properties, such as a low modulus-in-tension property and a high tensile elongation property. Therefore, as in the above-mentioned case, the use of a plasticizer is indispensable especially for improving the high tensile elongation property of the sealant. Accordingly, the above-mentioned problem accompanying the use of a plasticizer inevitably occurs.

SUMMARY OF THE INVENTION

In this situation, the present inventors have made extensive and intensive studies with a view toward developing a polyisocyanate which exhibits a high curing rate and a low viscosity and which, upon being cured, not only has no surface tack and exhibits a low modulus-in-tension property, but also exhibits a high tensile elongation property without a need for a plasticizer, so that the polyisocyanate can be advantageously used as a sealant. As a result, it has unexpectedly been found that the desired polyisocyanate having the above-mentioned excellent properties can be realized by a polyisocyanate which is obtained by reacting at least one diisocyanate selected from the group consisting of an aliphatic diisocyanate and an alicyclic diisocyanate with a polyol having an average molecular weight of from 3,000 to 30,000 and an average number of hydroxyl groups of from 2 to 3 and which contains allophanate linkages and urethane linkages in a specific ratio. Based on this novel finding, the present invention has been completed.

Accordingly, it is a primary object of the present invention to provide a polyisocyanate which exhibits a high curing rate and a low viscosity and which, upon being cured, not only has no surface tack and exhibits a low modulus-in-tension property, but also exhibits a high tensile elongation property without a need for a plasticizer, so that the polyisocyanate can be advantageously used as a sealant.

It is another object of the present invention to provide a method for effectively and efficiently producing the polyisocyanate which, upon being cured, is improved with respect to a low modulus-in-tension property and a high tensile elongation property.

The foregoing and other objects, features and advantages of the present invention will be apparent from the following detailed description and appended claims.

DETAILED DESCRIPTION OF THE INVENTION

According to the present invention, there is provided a polyisocyanate which is obtained by a process comprising reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3 and which has the following characteristics (1) to (4):
  (1) an allophanate linkage content of from 0.05 to 0.40, in terms of the ratio of the number of allophanate linkages in the polyisocyanate to the sum of the number of the allophanate linkages in the polyisocyanate and the number of urethane linkages in the polyisocyanate;
  (2) an average number of isocyanate groups of from 2.0 to 4.0;
  (3) an isocyanate group content of from 0.05 to 10% by weight; and
  (4) a viscosity of from 1,000 to 100,000 mpa·s as measured at 25° C.

For an easy understanding of the present invention, the essential features and various preferred embodiments of the present invention are enumerated below.

1. A polyisocyanate obtained by a process comprising reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3, the polyisocyanate having the following characteristics (1) to (4):
  (1) an allophanate linkage content of from 0.05 to 0.40, in terms of the ratio of the number of allophanate linkages in the polyisocyanate to the sum of the number of the allophanate linkages in the polyisocyanate and the number of urethane linkages in the polyisocyanate;
  (2) an average number of isocyanate groups of from 2.0 to 4.0;
  (3) an isocyanate group content of from 0.05 to 10% by weight; and
  (4) a viscosity of from 1,000 to 100,000 mpa·s as measured at 25° C.

2. The polyisocyanate according to item 1 above, wherein the polyol is a polyether polyol.

3. The polyisocyanate according to item 2 above, wherein the polyether polyol is a product obtained by effecting an addition polymerization of propylene oxide to a polyhydric alcohol, a polyhydric phenol, a polyamine, an alkanolamine or a polybasic carboxylic acid.

4. The polyisocyanate according to item 2 or 3 above, wherein the polyether polyol has an average number of hydroxyl groups of from 2.0 to 2.5.

5. The polyisocyanate according to any one of items 1 to 4 above, wherein the polyol has a number average molecular weight of from 6,000 to 30,000.

6. The polyisocyanate according to item 1 above, wherein the diisocyanate is an aliphatic diisocyanate.

7. The polyisocyanate according to item 6 above, wherein the aliphatic diisocyanate is hexamethylene diisocyanate.

8. A sealant comprising the polyisocyanate of any one of items 1 to 7 above.

9. The sealant according to item 8 above, which is free of a plasticizer.

10. A method for producing a polyisocyanate which, upon being cured, is improved with respect to a low modulus-in-tension property and a high tensile elongation property, the method comprising:
  (i) reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3, in a diisocyanate/polyol ratio of from 5/1 to 100/1 in terms of the isocyanate group/hydroxyl group equivalent ratio, to thereby obtain a polyisocyanate precursor having an allophanate linkage content of 0.10 or more, in terms of the ratio of the number of allophanate linkages in the polyisocyanate precursor to the sum of the number of the allophanate linkages in the polyisocyanate precursor and the number of urethane linkages in the polyisocyanate precursor, and having an isocyanate group content of from 0.05 to 10% by weight;
  (ii) removing substantially all unreacted diisocyanate monomers; and
  (iii) subjecting the polyisocyanate precursor to an addition reaction with a monohydric alcohol to an extent that a polyisocyanate having an average number of isocyanate groups of not less than 2 is obtained.

11. A method for producing a polyisocyanate which, upon being cured, is improved with respect to a low modulus-in-tension property and a high tensile elongation property, the method comprising:
  (i) providing the following polyisocyanate components (A) and (B):
    (A) a polyisocyanate component having an allophanate linkage content of 0.10 or more, in terms of the ratio of the number of allophanate linkages in polyisocyanate component (A) to the sum of the number of the allophanate linkages in polyisocyanate component (A) and the number of urethane linkages in polyisocyanate component (A), and having an isocyanate group content of from 0.05 to 10% by weight,
    polyisocyanate component (A) being prepared by reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3, in a diisocyanate/polyol ratio of from 5/1 to 100/1 in terms of the isocyanate group/hydroxyl group equivalent ratio, and
    (B) a polyisocyanate component having a number average molecular weight of from 1,000 to 30,000 and an allophanate linkage content of less than 0.05, in terms of the ratio of the number of allophanate linkages in polyisocyanate component (B) to the sum of the number of the allophanate linkages in polyisocyanate component (B) and the number of urethane linkages in polyisocyanate component (B), and having an average number of isocyanate groups of from 1.5 to 2.5,
    polyisocyanate component (B) being prepared by reacting at least one diisocyanate selected from the group consisting of an aliphatic diisocyanate and an alicyclic diisocyanate with a polyol, and removing substantially all unreacted diisocyanate monomers; and
  (ii) mixing polyisocyanate components (A) and (B) in an (A)/(B) weight ratio of from 5/1 to 1/10.

Hereinbelow, the present invention is described in detail.

The diisocyante used in the present invention is at least one diisocyante selected from the group consisting of an aliphatic diisocyante and an alicyclic diisocyanate. An aromatic diisocyanate can be used in combination with the above-mentioned at least one diisocyanate, as long as the objects of the present invention can be attained.

Of aliphatic diisocyanates, an aliphatic diisocyanate having 4 to 30 carbons is preferred. Of alicyclic diisocyanates, an alicyclic diisocyanate having 8 to 30 carbons is preferred.

Specific examples of diisocyanates used in the present invention include tetramethylene-1, 4-diisocyanate, pentamethylene-1, 5-diisocyanate, hexamethylene diisocyanate, 2,2,4-trimethylhexamethylene-1, 6-diisocyanate, lysine diisocyanate, isophorone diisocyanate, 1,3-bis(isocyanatomethyl)cyclohexane and 4,4'-dicyclohexylmethane diisocyanate. These diisocyanates can be used individually or in combination. Of these diisocyanates, hexamethylene diisocyanate (hereinafter, frequently referred to as "HDI") and isophorone diisocyanate (hereinafter, frequently referred to as "IPDI") are preferred from the viewpoint of the weatherability of a cured resin obtained by curing a polyisocyanate which is produced using the diisocyanate, and the commercial availability of the diisocyanate. Hexamethylene diisocyanate is especially preferred, since both isocyanate groups thereof are primary isocyanate groups having high reactivity.

Examples of aromatic diisocyanates include tolylene diisocyanate and 4,4'-diphenylmethane diisocyanate.

The polyol used in the present invention has a number average molecular weight of from 3,000 to 30,000 and an average number of hydroxyl groups of from 2 to 3. In the present invention, the term "average number of hydroxyl groups" of a polyol means an average number of hydroxyl groups contained in one molecule of the polyol.

Examples of polyols used in the present invention include polyether polyols, unsaturated hydrocarbon polymer polyols, acrylic polyols, polyester polyols. Of these polyols, polyether polyols are preferred.

Of polyether polyols, preferred is a polyol obtained by addition-polymerization of an epoxy compound with a polyhydric alcohol, a polyhydric phenol, a polyamine, an alkanolamine or a polyhydric carboxylic acid in the presence of a catalyst.

Examples of polyhydric alcohols include dihydric alcohols, such as ethylene glycol, diethylene glycol, propylene glycol, dipropylene glycol, neopentyl glycol, 1,4-butanediol and 1,6-hexanediol; and trihydric alcohols, such as glycerol and trimethylolpropane. Examples of polyhydric phenols include dihydric phenols, such as bisphenol A. Examples of polyamines include diamines, such as ethylenediamine, N-ethylethylenediamine and N,N'-diethylethylenediamine. Examples of alkanolamines include dihydric and trihydric alkanolamines, such as ethanolamine and N-ethylethanolamine. Examples of polyhydric carboxylic acids include dihydric carboxylic acids, such as adipic acid and phthalic acid. These compounds can be used individually or in combination.

Examples of epoxy compounds include ethylene oxide, propylene oxide, butylene oxide, cyclohexene oxide and styrene oxide. Of these compounds, propylene oxide is preferred. These compounds can be used individually or in combination.

Examples of catalysts include a strongly basic catalysts, such as hydroxides of lithium, sodium, potassium and cesium, alcoholates and trialkylamines; metal porphyrins; complexes of metals and at least tridentate chelating agents; composite metal complexes, such as a composite metal cyano compound complex (e.g., zinc hexacyanocobaltate complex). These compounds can be used individually or in combination.

In addition to the above-mentioned polyether polyols, hydrofuran polymers, such as a polymer obtained by ring-opening polymerization of tetrahydrofuran, can also be used.

Each of the above-mentioned unsaturated hydrocarbon polymer polyols is a polyol obtained by polymerizing unsaturated hydrocarbon monomers to obtain a hydrocarbon polymer and substituting terminals of the obtained hydrocarbon polymer with hydroxyl groups. Examples of unsaturated hydrocarbon monomers include monoolefins and diolefins. Examples of monoolefins include monoolefins having 2 to 6 carbons, such as ethylene, propylene, 1-butene, 2-butene, isobutylene, 1-pentene, 2-pentene, 2-methyl-1-butene and 2-methyl-2-butene. Examples of diolefins include allene, 1,2-butadiene, 1,3-butadiene, 1,3-pentadiene, isoprene, 1,5-hexadiene, chloroprene and divinylbenzene. Polymers obtained from these unsaturated hydrocarbon monomers can be homopolymers, or copolymers obtained by polymerizing two or more different types of monomers. When diolefin monomers are polymerized to produce a polymer, the number of unsaturated bonds present in the polymer can, after completion of the polymerization, be decreased by hydrogenation.

An acrylic polyol can be obtained by copolymerizing a compound (having, in a molecule thereof, a hydroxyl group) with a (meth)acrylate (having, in a molecule thereof, no active hydrogen) in the presence or absence of a polymerizable monomer other than these compounds.

Examples of compounds (having, in a molecule thereof, a hydroxyl group) include a polyoxyalkylene mono(meth)acrylate obtained by addition-bonding to (meth)acrylic acid an epoxy compound, such as ethylene oxide or propylene oxide, or by condensing (meth)acrylic acid with a polyoxyalkylene, such as a polyethylene glycol. Further examples of compounds (having, in a molecule thereof, a hydroxyl group) include an alkylene oxide-added compound obtained by addition-bonding an alkylene oxide (such as ethylene oxide or propylene oxide) to the hydroxyl group of a hydroxyalkyl (meth)acrylate, such as a hydroxyalkyl acrylate (such as 2-hydroxyethyl acrylate, 2-hydroxypropyl acrylate or 2-hydroxybutyl acrylate), a hydroxyalkyl methacrylate (such as 2-hydroxyethyl methacrylate, 2-hydroxypropyl methacrylate, 2-hydroxybutyl methacrylate, 3-hydroxypropyl methacrylate or 4-hydroxybutyl methacrylate), (meth)acrylic monoester of glycerin, or (meth)acrylic monoester of trimethylolpropane. Still further examples of compounds (having, in a molecule thereof, a hydroxyl group) include a polycaprolactone-modified compound of a hydroxyalkyl (meth)acrylate (such as 2-hydroxyethyl acrylate); (meth)allyl alcohol; and 4-hydroxymethylstyrene. These compounds can be used individually or in combination.

Examples of (meth)acrylates having no active hydrogen include acrylates, such as methyl acrylate, ethyl acrylate, isopropyl acrylate, n-butyl acrylate, 2-ethylhexyl acrylate and methoxyethyl acrylate; and methacrylates, such as methyl methacrylate, ethyl methacrylate, isopropyl methacrylate, n-butyl methacrylate, isobutyl methacrylate, n-hexyl methacrylate, lauryl methacrylate and methoxyethyl methacrylate. These compounds can be used individually or in combination.

Examples of polymerizable monomers, in the presence or absence of which a hydroxyl group-having compound is copolymerized with a (meth)acrylic acid ester having no active hydrogen to obtain an acrylic polyol, include unsaturated carboxylic acids, such as acrylic acid, methacrylic acid, maleic acid and itaconic acid; unsaturated amides, such as acrylamide, N-methylolacrylamide and diacetoneacrylamide: glycol di(meth)acrylates, such as a diester of (meth)acrylic acid with an alkylene glycol (such as ethylene glycol) and a diester of (meth)acrylic acid with an polyoxyalkylene glycol (such as ethylene oxide polymer or propylene oxide polymer); fluorine-containing monomers, such as tetrafluoroethylene, chlorotrifluoroethylene, trifluoroethylene, vinylidene fluoride, vinyl fluoride, hexafluoropropylene and pentafluoropropylene; styrene; vinyltoluene; vinyl acetate; acrylonitrile; and dibutyl fumarate. These polymerizable monomers can be used individually or in combination.

If desired, a polymerization reaction for obtaining the above-mentioned acrylic polyols can be performed in the presence of a hydroxyalkyl polysulfide (such as hydroxymethyl disulfide, hydroxymethyl trisulfide, 2-hydroxyethyl disulfide, 2-hydroxyethyl trisulfide or 3-hydroxypropyl trisulfide), a polysulfide carboxylic acid (such as 2,2'-dithiodiacetic acid or 2,2'-trithiodiacetic acid) or the like.

Examples of polyester polyols include a polyester polyol obtained by condensation polymerization of at least one dicarboxylic acid with at least one polyhydric alcohol. Examples of dicarboxylic acids include succinic acid, adipic acid, sebacic acid, dimeric acid, maleic anhydride, phthalic anhydride, isophthalic acid and terephthalic acid. Examples of polyhydric alcohols include ethylene glycol, propylene glycol, diethylene glycol, neopentyl glycol, trimethylolpropane and glycerin. Specific examples of polyester polyols include a polycaprolactone obtained by ring-opening polymerization of ε-caprolactone with a polyhydric alcohol.

The polyol used in the present invention has an average number of hydroxyl groups of from 2 to 3, preferably from 2 to 2.5. When the average number is less than 2, the curability of the polyisocyanate or a sealant comprising the same is lowered. When the average number is more than 3, the mechanical properties of a cured form of the polyisocyanate or a cured sealant comprising the same are lowered.

The polyol used in the present invention has a number average molecular weight of from 3,000 to 30,000, preferably from 6,000 to 30,000, more preferably from 6,000 to 15,000, as calculated from the average number of hydroxyl groups of the polyol and the hydroxyl value of the polyol. When the number average molecular weight is less than 3,000, the mechanical properties of a cured form of the polyisocyanate or a cured sealant comprising the same are lowered. When the number average molecular weight is more than 30,000, the curability of the polyisocyanate or a sealant comprising the same is lowered.

In the present invention, if desired, a compound (other than the above-mentioned polyols) having the reactivity with an isocyanate group can also be used. Examples of such compounds include amines and mercapto group-containing compounds.

The polyisocyanate of the present invention has a specific allophanate linkage content and a specific average number of isocyanate groups, so that the polyisocyanate of the present invention is excellent in that a sealant comprising the polyisocyanate not only exhibits a high curability and a low viscosity, but also, upon being cured, exhibits a low modulus-in-tension property and a high tensile elongation property.

Generally, for obtaining a polyisocyanate having a satisfactory curability, the polyisocyanate must be controlled so as to have a specific average number of isocyanate groups or more. For this purpose, conventionally, a polyol having a high average number of hydroxyl groups have been used. However, in the present invention, a polyisocyanate having a satisfactory curability can be obtained by controlling the allophanate linkage content of the polyisocyanate within a specific range, as mentioned below. The reaction of the diisocyanate with the polyol is so controlled that allophanate linkages as well as urethane linkages are formed. The number of diisocyanate molecules which are reacted with a single polyol molecule is also controlled so as to be within a specific range.

In the present invention, the term "allophanate linkage content" of a polyisocyanate means the ratio of the number of allophanate linkages in the polyisocyanate to the sum of the number of the allophanate linkages in the polyisocyante and the number of urethane linkages in the polyisocyanate.

In the present invention, the allophanate linkage content of a polyisocyanate can be measured, for example, by a method in which the proton nuclear magnetic resonance ($^1$H-NMR) spectrum of a polyisocyanate is measured. The method is described below in detail.

20 to 50 mg of a polyisocyanate is dissolved in about 0.5 g of acetone-$d_6$ (($CD_3$)$_2$CO) (containing about 100 ppm by weight of tetramethylsilane as a chemical shift standard substance) to thereby obtain a sample solution. The $^1$H-NMR spectrum of the sample solution is measured to thereby obtain, in the $^1$H-NMR spectrum, a signal ascribed to allophanate linkages (observed in the vicinity of 8.5 ppm) and a signal ascribed to urethane linkages (observed in the vicinity of 6 ppm). The integral (area) (A) of the signal ascribed to allophanate linkages and the integral (area) (U) of the signal ascribed to urethane linkages are obtained, and the allophanate linkage content is calculated from (A) and (U) values by the following formula:

The allophanate linkage content=(A)/((A)+(U)).

The polyisocyanate of the present invention has an allophanate linkage content of from 0.05 to 0.40. When the allophanate linkage content is more than 0.40, the crosslink density and urea linkage content of a cured form of the polyisocyanate become high due to an increase in the average number of isocyanate groups, so that a sealant comprising the polyisocyanate, upon being cured, disadvantageously exhibits a high modulus-in-tension property and a low tensile elongation property. When the allophanate linkage content is less than 0.05, a decrease in the average number of isocyanate groups of the polyisocyanate possibly causes disadvantages in that a sealant comprising the polyisocyanate has a unsatisfactory curability or has no curability.

In the present invention, the term "average number of isocyanate groups" of a polyisocyanate means an average number of isocyanate groups contained in one molecule of the polyisocyanate. The average number of isocyanate groups can be obtained by the following formula using the number average molecular weight of the polyisocyanate and the isocyanate group content of the polyisocyanate mentioned below:

The average number of isocyanate groups={(number average molecular weight of a polyisocyanate)×(isocyanate group content)/100}/42, wherein the value of 42 is the molecular weight of an isocyanate group.

The number average molecular weight of a polyisocyanate can be determined by gel permeation chromatography (hereinafter, frequently referred to as "GPC") using a calibration curve obtained with respect to standard polystyrene samples.

The polyisocyanate of the present invention has an average number of isocyanate groups of from 2.0 to 4.0. When the average number of isocyanate groups is less than 2.0, the crosslink density of a cured form of the polyisocyanate is unsatisfactory, so that a sealant comprising the polyisocyanate has a lowered curability. When the average number of isocyanate groups is more than 4.0, the crosslink density and urea linkage content of a cured form of the polyisocyanate are high, so that a sealant comprising the polyisocyanate, upon being cured, exhibits a high modulus-in-tension property and a low tensile elongation property.

The polyisocyanate of the present invention has an isocyanate group content of from 0.05 to 10% by weight, preferably from 0.5 to 5% by weight.

In the present invention, the "isocyanate group content" of a polyisocyanate is defined as the percent by weight of isocyanate groups in the polyisocyanate, based on the weight of the polyisocyanate. The isocyanate group content of a polyisocyanate can be measured, for example, by the following method.

5 to 10 g of a polyisocyanate is accurately weighed and dissolved in 20 ml of toluene. To the resultant solution is added 20 ml of a 2 N solution of n-dibutylamine in toluene. The resultant mixture is allowed to stand at room temperature for 15 minutes to thereby effect a reaction. After completion of the reaction, the whole amount of the resultant reaction mixture is subjected to back titration using 1 N hydrochloric acid to measure the volume of the hydrochloric acid (titer of sample titration) needed for neutralizing the unreacted n-dibutylamine in the above-mentioned resultant reaction mixture.

The volume of 1N hydrochloric acid (titer of blank titration) needed for neutralizing the unreacted n-dibutylamine is measured repeating substantially the same procedure as mentioned above, except that no polyisocyanate is used.

Using the titer of sample titration and the titer of blank titration obtained above, the isocyanate group content is calculated by the following formula:

The content (% by weight) of isocyanate groups={(titer (ml) of blank titration−titer (ml) of sample titration)×42/(the weight (g) of sample×1,000)}×100.

Generally, a polyisocyanate is cured as follows. Isocyanate groups in a polyisocyanate are reacted with moisture (water) in the air to thereby form amino groups. The formed amino groups are reacted with the remaining isocyanate groups in the polyisocyanate to thereby cure the polyisocyanate. When the polyisocyanate has an isocyanate group content of less than 0.05% by weight, the above-mentioned reactions hardly occur, so that the curability of the polyisocyanate is lowered. On the other hand, when the isocyanate group content is more than 10% by weight, a cured form of the polyisocyanate is likely to have a high urea linkage content. Therefore, a sealant comprising the polyisocyanate, upon being cured, unfavorably exhibits a high modulus-in-tension property and a low tensile elongation property. Moreover, the amount of carbon dioxide gas produced as a by-product of the above-mentioned reaction between the isocyanate groups and water increases, possibly causing foaming.

The polyisocyanate of the present invention has a viscosity of from 1,000 to 100,000 mPa·s, preferably from 1,000 to 30,000 mPa·s, as measured at 25° C. When the viscosity is less than 1,000 mPa·s or more than 100,000 mpa·s, the polyisocyanate has a problem in that a sealant comprising the polyisocyanate exhibits an unsatisfactory workability.

It is preferred that the polyisocyanate of the present invention does not contain a diisocyanate remaining unreacted after the above-mentioned reaction between a diisocyanate and a polyol. However, it is not necessary to completely remove the diisocyanate remaining unreacted.

In the present invention, the remaining diisocyanate concentration (hereinafter, frequently referred to as the "diisocyanate monomer concentration") can be determined by the following method.

GPC is conducted to obtain a chromatogram under substantially the same conditions as used for the determination of the number average molecular weight of a polyisocyanate. From the obtained chromatogram, the area of the peak having a retention time corresponding to the molecular weight of the diisocyanate monomer is determined. The percent of the determined peak area, based on the total area of all peaks in the chromatogram, is defined as the diisocyanate monomer concentration (% by weight).

The polyisocyanate of the present invention has a diisocyanate monomer concentration of 5% by weight or less, preferably 1% by weight or less, more preferably 0.5% by weight or less. When the diisocyanate monomer concentration exceeds 5% by weight, the diisocyanate monomer generates unfavorable smell, so that the environment is adversely affected. Further, the polyisocyanate after curing, or a sealant comprising the same is deteriorated with respect to mechanical properties. Moreover, carbon dioxide gas is produced as a byproduct of the reaction of the diisocyanate monomer with water, which is likely to cause foaming.

In the present invention, when the above-mentioned diisocyanate is reacted with the above-mentioned polyol, the reaction is performed in a diisocyanate/polyol ratio of from 5/1 to 100/1, preferably from 10/1 to 100/1, in terms of the isocyanate group/hydroxyl group equivalent ratio. When the ratio is less than 5/1, the produced polyisocyanate has a disadvantageously high viscosity. When the ratio is more than 100/1, not only the yield but also the productivity is disadvantageously lowered.

In the reaction of the diisocyanate with the polyol, a solvent may be used. As a solvent for the reaction, there can be mentioned a solvent inert to isocyanate groups. Examples of such solvents include esters, such as ethyl acetate and butyl acetate; and aromatic hydrocarbons, such as toluene and xylene. It is preferred that, after completion of the reaction, the solvent is removed by evaporation (using, for example, a wiped film evaporator), extraction or the like.

The reaction temperature is preferably from 60 to 200° C., more preferably from 80 to 180° C. When the reaction temperature is lower than 60° C., not only is the reaction rate likely to be lowered, which disadvantageously lowers the productivity, but also allophanate linkages are not easily produced. When the reaction temperature is higher than 200° C., disadvantages are caused in that the produced polyisocyanate is likely to suffer discoloration.

The reaction may be performed in the presence of a catalyst. When using a catalyst, a basic catalyst is preferred. Examples of basic catalysts include: quaternary ammonium compounds, such as a hydroxide of a tetraalkylammonium, and a tetraalkyl ammonium salt of an organic weak acid (such as acetic acid or capric acid); tertiary amine compounds, such as trioctylamine, 1,4-diazabicyclo(2,2,2)octane, 1,8-diazabicyclo(5,4,0)-undecene-7, and 1,5-diazabicyclo(4,3,0)nonene-5; and compounds which are known as catalysts for accelerating an allophanation reaction, such as an acetylacetonato complex with a metal (such as zinc), and a metal salt of an organic weak acid comprising a metal (such as zinc, divalent tin, tetravalent tin, lead or iron) and a carboxylic acid (such as acetic acid, propionic acid, butyric acid, 2-ethylhexanoic acid or naphthenic acid). If desired, an auxiliary catalyst may be used in combination with the above-mentioned catalyst. Examples of auxiliary catalysts include organic phosphonic triesters, such as tris(tridecyl)phosphite and tris(2-ethylhexyl)phosphite. The catalyst is used generally in an amount of from 10 ppm to 1.0% by weight, based on the weight of the diisocyanate.

In the reaction of the diisocyanate with the polyol, isocyanate groups are reacted with hydroxyl groups to form urethane linkages. The formed urethane linkages are partly converted to allophanate linkages, so that a polyisocyanate having allophanate linkages is obtained. By not only controlling the reaction conditions, such as the reaction temperature and reaction time, but also determining, when using a catalyst, what type of and what amount of catalyst is used, a polyisocyanate having an allophanate linkage content of 0.05 or more in the above-mentioned terms can be obtained.

When a catalyst is used in the reaction, if desired, the catalyst can be deactivated after completion of the reaction. The deactivation of the catalyst can be done, for example, by heating, or by adding an effective compound. Examples of compounds which can be used for deactivating the catalyst include acids, such as dodecylbenzenesulfonic acid, monochloroacetic acid, phosphoric acid, acidic phosphoric esters (such as dibutyl phosphate and dioctyl phosphate) and acidic phosphites (such as dibutyl phosphite and dioctyl phosphite); and organic acid halides, such as benzoyl chloride.

After completion of the reaction, substantially all unreacted diisocyanate monomers are removed by evaporation (using, for example, a wiped film evaporator), extraction or the like, so that, as mentioned above, the polyisocyanate of the present invention has a diisocyanate monomer concentration of 5% by weight or less, preferably 1% by weight or less, more preferably 0.5% by weight or less.

It is unexpected that the polyisocyanate of the present invention, which has allophanate linkages and urethane linkages in a specific ratio, is excellent in curability, mechanical properties after curing, and the like, as compared to a conventional urethane polyisocyanate, which is obtained by reacting a diisocyanate with a polyol in an isocyanate group/hydroxyl group equivalent ratio of approximately 1/1.

As mentioned above, in a conventional method for producing a conventional urethane polyisocyanate, which comprises reacting a diisocyanate with a polyol, monools contained in the polyol are addition-bonded to both isocyanate groups in the diisocyanate to thereby produce unreactive, low molecular weight compounds. Therefore, when a sealant is obtained using the conventional urethane polyisocyanate produced, the sealant inevitably contains these unreactive compounds. Accordingly, these unreactive compounds are likely to ooze out of the surface of the sealant after curing. On the other hand, the polyisocyanate of the present invention is obtained by reacting a diisocyanate with a polyol under conditions wherein isocyanate groups are present in an excess amount, relative to hydroxyl groups. Therefore, even if compounds in which a monool is addition-bonded to an isocyanate group in the diisocyanate are produced, almost all of the compounds are compounds in which one of the two isocyanate groups in the diisocyanate is not bonded to a monool. These compounds have an unreacted isocyanate group in a molecule thereof and, hence, retain reactivity (i.e., curability). Accordingly, there is no possibility that these compounds ooze out of the surface of the sealant after curing. It is a matter of course that the yield of unreactive, low molecular weight compounds is remarkably low, as compared to the case of a conventional urethane polyisocyanate.

The yield of the polyisocyanate in the above reaction is generally about from 20 to 70% by weight.

The polyisocyanate of the present invention can be advantageously used as a material for a sealant having excellent physical properties, without a need for a plasticizer which is an essential component for a conventional sealant. The sealant of the present invention is free of a plasticizer and, hence, is completely free of the above-mentioned various problems accompanying the use of a plasticizer.

Hereinbelow, an explanation is made with respect to the method for effectively and efficiently producing the polyisocyanate of the present invention, which has an allophanate linkage content of from 0.05 to 0.40.

The polyisocyanate of the present invention can be obtained not only by controlling the reaction conditions for producing the polyisocyanate, such as the reaction temperature and reaction time, but also by determining, when using a catalyst, what type and amount of catalyst is used. Of the methods for producing the polyisocyanate of the present invention, the following two methods are especially preferred.

Method 1: Addition of a Monohydric Alcohol.

Method 1 comprises:

(i) reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3, in a diisocyanate/polyol ratio of from 5/1 to 100/1 in terms of the isocyanate group/hydroxyl group equivalent ratio, to thereby obtain a polyisocyanate precursor having an allophanate linkage content of 0.10 or more, in terms of the ratio of the number of allophanate linkages in the polyisocyanate precursor to the sum of the number of the allophanate linkages in the polyisocyanate precursor and the number of urethane linkages in the polyisocyanate precursor, and having an isocyanate group content of from 0.05 to 10% by weight;

(ii) removing substantially all unreacted diisocyanate monomers; and (iii) subjecting the polyisocyanate precursor to an addition reaction with a monohydric alcohol to an extent that a polyisocyanate having an average number of isocyanate groups of not less than 2 is obtained.

In method 1, a polyisocyanate precursor having an allophanate linkage content of 0.10 or more is subjected to an addition reaction with a monohydric alcohol, so that the monohydric alcohol is bonded to a part or all of the isocyanate groups in the polyisocyanate precursor to form urethane linkages. The formation of the urethane linkages in the polyisocyanate precursor lowers the allophanate linkage content of the polyisocyanate precursor, so that a desired polyisocyanate which, upon being cured, is improved with respect to a low modulus-in-tension property and a high tensile elongation property can be obtained.

The reaction of the diisocyanate with the polyol in step (i) above can be performed in the presence or absence of a catalyst. When a catalyst is not used, it is preferred that the reaction is performed at a temperature of from 130 to 200° C. under atmospheric pressure for a period of from 1 to 10 hours. When a catalyst is used, it is preferred that the reaction is performed at a temperature of from 60 to 120° C. under atmospheric pressure for a period of from 0.5 to 5 hours. An aromatic diisocyanate may be used in combination with the above-mentioned diisocyanate, as long as the objects of the present invention can be attained. Examples of aromatic diisocyanates include tolylene diisocyanate and 4,4'-diphenylmethane diisocyanate.

As a catalyst used, there can be mentioned the same catalyst as used for producing the above-mentioned polyisocyanate.

The polyisocyanate precursor obtained by the above-mentioned method has an allophanate linkage content of 0.10 or more, in terms of the ratio of the number of allophanate linkages in the polyisocyanate precursor to the sum of the number of the allophanate linkages in the polyisocyanate precursor and the number of urethane linkages in the polyisocyanate precursor; an average number of isocyanate groups of from 2.5 to 4.0; an isocyanate group content of from 0.05 to 10% by weight; a viscosity of from 500 to 100,000 mPa·s as measured at 25° C.; and a number average molecular weight of from 1,000 to 30,000.

The removal of unreacted diisocyanates in step (ii) above can be conducted by the above-mentioned method.

The monohydric alcohol used in step (iii) above is required only to have an average number of hydroxyl groups of 1 in a molecule thereof. The monohydric alcohol may have, in a molecule thereof, an ester group, an ether group, a cyclohexane ring, an aromatic ring or the like. Examples of such monohydric alcohols include a low molecular weight alcohol, and an alcohol having an acryl, a polyester, a polybutadiene or a polyether skeleton.

With respect to the molecular weight of the monohydric alcohol, there is no particular limitation. However, the molecular weight of the monohydric alcohol is preferably 30,000 or less, more preferably from 500 to 10,000, most preferably from 500 to 5,000. When the molecular weight of the monohydric alcohol is more than 30,000, the curability of the polyisocyanate produced in step (iii) above is likely to be unsatisfactory.

Examples of monohydric alcohols which can be used in the present invention include: aliphatic alcohols, such as methanol, ethanol, propanol, n-butanol, 2-butanol, t-butanol, n-pentanol, 2-pentanol, 3-pentanol, 2-methylbutanol, 3-methylbutanol, 2-ethylpropanol, 2,2-dimethylpropanol, n-hexanol, n-heptanol and 2-ethylhexanol; ether alcohols, such as methyl cellosolve, ethyl cellosolve and butyl cellosolve; alicyclic alcohols, such as cyclopentanol and dimethylcyclohexanol; and aromatic alcohols, such as benzyl alcohol. Further examples of monohydric alcohols include: polyether monohydric alcohols obtained by subjecting at least one member selected from the group consisting of the monohydric alcohols mentioned above, monohydric phenols (such as phenol and cresol) and monocarboxylic acids (such as formic acid, acetic acid and benzoic acid) to addition reaction with at least one member selected from the group consisting of ethylene oxide, propylene oxide, butylene oxide, cyclohexene oxide, styrene oxide and the like, preferably with propylene oxide; and polyester monohydric alcohols obtained by subjecting at least one member selected from the group consisting of the monohydric alcohols mentioned above, monohydric phenols (such as phenol and cresol) and monocarboxylic acids (such as formic acid, acetic acid and benzoic acid) to addition reaction with ε-caprolactone or the like.

The ratio of the polyisocyanate precursor to the monohydric alcohol varies depending on the above-mentioned allophanate linkage content of the polyisocyanate precursor. The ratio is from 1.5/1 to 100/1, preferably from 2/1 to 20/1, in terms of the equivalent ratio of isocyanate groups in the polyisocyanate precursor to hydroxyl groups in the monohydric alcohol. When the ratio is less than 1.5/1, it is possible that the curability of a sealant obtained from the polyisocyanate produced above is lowered. When the ratio is more than 100/1, it is possible that the sealant, being upon cured, is deteriorated with respect to mechanical properties.

In the reaction of the polyisocyanate precursor with the monohydric alcohol, the polyisocyanate precursor is subjected to an addition reaction with the monohydric alcohol to an extent that a monohydric alcohol-added polyisocyanate having an average number of isocyanate groups of not less than 2 is obtained. The reaction is generally performed at a temperature of from 50 to 150° C. for a period of from 30 minutes to 4 hours. As a catalyst for the reaction, there can be mentioned the same catalyst as used for producing the above-mentioned polyisocyanate.

The monohydric alcohol-added polyisocyanate thus obtained has the following characteristics:
(1) an allophanate linkage content of from 0.05 to 0.40, preferably 0.10 to 0.40;
(2) an average number of isocyanate groups of from 2.0 to 4.0;
(3) an isocyanate group content of from 0.05 to 10% by weight; and
(4) a viscosity of from 1,000 to 100,000 mPa·s as measured at 25° C.

It is preferred that the monohydric alcohol-added polyisocyanate has an allophanate linkage content of from 0.20 to 0.40 and an average number of isocyanate groups of from 2.5 to 4.0.

Method 2: Mixing of Two Polyisocyanate Components (A) and (B),

Method 2 Comprises:
(i) providing the following polyisocyanate components (A) and (B):
  (A) a polyisocyanate component having an allophanate linkage content of 0.10 or more, in terms of the ratio of the number of allophanate linkages in polyisocyanate component (A) to the sum of the number of the allophanate linkages in polyisocyanate component (A) and the number of urethane linkages in polyisocyanate component (A), and having an isocyanate group content of from 0.05 to 10% by weight,
    polyisocyanate component (A) being prepared by reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3, in a diisocyanate/polyol ratio of from 5/1 to 100/1 in terms of the isocyanate group/hydroxyl group equivalent ratio, and
  (B) a polyisocyanate component having a number average molecular weight of from 1,000 to 30,000 and an allophanate linkage content of less than 0.05, in terms of the ratio of the number of allophanate linkages in polyisocyanate component (B) to the sum of the number of the allophanate linkages in polyisocyanate component (B) and the number of urethane linkages in polyisocyanate component (B), and having an average number of isocyanate groups of from 1.5 to 2.5,
    polyisocyanate component (B) being prepared by reacting at least one diisocyanate selected from the group consisting of an aliphatic diisocyanate and an alicyclic diisocyanate with a polyol, and removing substantially all unreacted diisocyanate monomers; and
(ii) mixing polyisocyanate components (A) and (B) in an (A)/(B) weight ratio of from 5/1 to 1/10.

In method 2, polyisocyanate component (A) (which has an allophanate linkage content of 0.10 or more) is mixed with polyisocyanate component (B) (which has substantially no allophanate linkage) to thereby adjust the allophanate linkage content of a polyisocyanate as a mixture of polyisocyanate components (A) and (B), so that a polyisocyanate which, upon being cured, is improved with respect to a low modulus-in-tension property and a high tensile elongation property can be obtained.

The reaction for producing polyisocyanate compotnent (A) used in method 2 can be performed in the presence or absence of a catalyst. When a catalyst is not used, it is preferred that the reaction is performed at a temperature of from 130 to 200° C. under atmospheric pressure for a period of from 1 to 10 hours. When a catalyst is used, it is preferred that the reaction is performed at a temperature of from 60 to 120° C. under atmospheric pressure for a period of from 0.5 to 5 hours. It is preferred that after the reaction, substantially all unreacted diisocyanate monomers are removed by the above-mentioned method.

An aromatic diisocyanate may be used in combination with at least one diisocyanate mentioned above, as long as the objects of the present invention can be attained. Examples of aromatic diisocyanates include tolylenediisocyanate and 4,4'-diphenylmethanediisocyanate.

As a catalyst for the reaction, there can be mentioned the same catalyst as used for producing the above-mentioned polyisocyanate.

Polyisocyanate component (A) produced by the above-mentioned method has an allophanate linkage content of 0.10 or more, in terms of the ratio of the number of allophanate linkages in polyisocyanate component (A) to the sum of the number of the allophanate linkages in polyisocyanate component (A) and the number of urethane linkages in polyisocyanate component (A); an average number of isocyanate groups of from 2.5 to 4.0; an isocyanate group content of from 0.05 to 10% by weight; a viscosity of from 500 to 100,000 mPa·s as measured at 25° C.; and a number average molecular weight of from 1,000 to 30,000. The number average molecular weight of polyisocyanate component (A) is easily calculated from the number average molecular weight of the polyol used for the production of polyisocyanate component (A), the isocyanate group/hydroxyl group equivalent ratio in the reaction of the diisocyanate with the polyol, and the isocyanate group content of polyisocyanate component (A).

It is preferred that the polyol used for producing polyisocyanate component (B) has an average number of hydroxyl groups of from 1.5 to 2.5.

It is preferred that the reaction for producing polyisocyanate component (B) is performed in a diisocyanate/polyol ratio of from 5/1 to 100/1 in terms of the isocyanate group/hydroxyl group equivalent ratio. The reaction may be performed in the presence or absence of a catalyst. When a catalyst is not used, it is preferred that the reaction is performed at a temperature of from 90 to 130° C. under atmospheric pressure for a period of from 0.5 to 10 hours. When a catalyst is used, it is preferred that the reaction is performed at a temperature of from 60 to 90° C. under atmospheric pressure for a period of from 0.5 to 3 hours. It is preferred that after the reaction, substantially all unreacted diisocyanate monomers are removed by the above-mentioned method.

An aromatic diisocyanate may be used in combination with the at least one diisocyanate mentioned above, as long as the objects of the present invention can be attained. Examples of aromatic diisocyanates include tolylene diisocyanate and 4,4'-diphenylmethane diisocyanate.

As a catalyst for the reaction, there can be mentioned the same catalyst as used for producing the above-mentioned polyisocyanate.

Polyisocyanate component (B) obtained by the above-mentioned method has an allophanate linkage content of less than 0.05, in terms of the ratio of the number of allophanate linkages in polyisocyanate component (B) to the sum of the number of the allophanate linkages in polyisocyanate component (B) and the number of urethane linkages in polyisocyanate component (B); an average number of isocyanate groups of from 1.5 to 2.5; an isocyanate group content of from 0.05 to 10% by weight; a viscosity of from 500 to 30,000 mPa·s as measured at 25° C.; and a number average molecular weight of from 1,000 to 30,000. When polyisocyanate component (B) has a number average molecular weight of less than 1,000, a sealant comprising the polyisocyanate obtained in step (iii) above, upon being cured, is deteriorated with respect to mechanical properties. When polyisocyanate component (B) has a number average molecular weight of more than 30,000, the curability of the sealant is lowered. The average number of hydroxyl groups of the polyol used for producing polyisocyanate component (B) is easily calculated from the average number of isocyanate groups of polyisocyanate component (B), and the allophanate linkage content of polyisocyanate component (B).

Polyisocyanate components (A) and (B) thus produced are mixed in an (A)/(B) weight ratio of from 5/1 to 1/10, preferably from 1/1 to 1/10, for a period of from 30 minutes to 1 hour, thereby obtaining a polyisocyanate as a mixture of polyisocyanate components (A) and (B). When the (A)/(B) weight ratio is more than 5/1, a sealant comprising the polyisocyanate, upon being cured, is likely to be deteriorated with respect to mechanical properties, such as a high tensile elongation property. When the (A)/(B) weight ratio is less than 1/10, the curability of the sealant is likely to be lowered.

The thus obtained polyisocyanate has the following characteristics:

(1) an allophanate linkage content of from 0.05 to 0.40, preferably from 0.10 to 0.40;
(2) an average number of isocyanate groups of from 2.0 to 4.0;
(3) an isocyanate group content of from 0.05 to 10% by weight: and
(4) a viscosity of from 1,000 to 100,000 mPa·s as measured at 25° C.

It is preferred that the polyisocyanate has an allophanate linkage content of from 0.10 to 0.30 and an average number of isocyanate groups of from 2.5 to 3.5.

If desired, the polyisocyanate of the present invention may be used as a curable resin by adding thereto a hydrolyzable, silicon-containing compound. It is preferred that the hydrolyzable, silicon-containing compound has active hydrogen capable of reacting with an isocyanate group and is represented by the following formula:

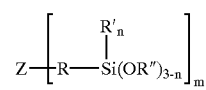

wherein:
R represents an alkylene group (which may contain a hetero atom, such as sulfur or oxygen),
R' represents hydrogen, an alkyl group, or an aryl group;
R" represents hydrogen, an alkyl group, or an aryl group,
n represents an integer of from 0 to 2,
m represents 1 or 2, with the proviso that when m is 1, Z represents an amino group, a monosubstituted amino group, a hydroxyl group, a mercapto group, a carboxyl group or a ureid group; and when m is 2, Z represents an amino group, or a ((monosubstituted amino)alkyl) amino group.

Examples of hydrolyzable groups of the hydrolyzable, silicon-containing compound include an alkoxysilyl group, an acyloxysilyl group, an aminoxysilyl group, a phenoxysilyl group, a tioalkoxysilyl group and a ketoximesilyl group.

Hereinbelow, examples of hydrolyzable, silicon-containing compounds represented by the above-mentioned formula are enumerated.

Examples of such compounds wherein Z is an amino group include 3-aminopropylmethoxydimethylsilane, 3-aminopropyldimethoxymethylsilane, 3-aminopropyltrimethoxysilane, 3-aminopropylethoxydimethylsilane, 3-aminopropylethoxymethylsilane, 3-aminopropyltriethoxysilane, 3-aminopropylmethoxydiethylsilane, 3-aminopropyldimethoxyethylsilane, 3-aminopropylethoxydiethylsilane, 3-aminopropyldiethoxyethylsilane, 3-aminopropyldiphenoxymethylsilane, 2-(2-aminoethyltio) ethyldiethoxymethylsilane, 2-(2-aminoethyltio) ethyltriethoxysilane and N,N-bis(3-(trimethoxysilyl)propyl) ethylenediamine.

Examples of such compounds wherein Z is a monosubstituted amino group include N-methylaminopropyldimethoxymethylsilane, N-ethylaminopropyldimethoxymethylsilane, dimethoxy-3-piperazinopropylsilane, 3-piperazinopropyltrimethoxysilane, 3-benzylaminopropyltrimethoxysilane, N,N-bis(3-(methyldimethoxysilyl)propyl)amine, N-phenylaminomethyltrimethoxysilane and N-phenylaminopropyltrimethoxysilane.

Examples of such compounds wherein Z is a hydroxyl group include 3-hydroxypropyltrimethoxysilane. Exampes of such compounds wherein Z is a mercapto group include 3-mercaptopropyldimethoxymethylsilane and 3-mercaptopropyltrimethoxysilane.

It is preferred that the reaction of the polyisocyanate with a hydrolyzable, silicon-containing compound having active hydrogen is performed in an active hydrogen/isocyanate group equivalent ratio of from 1/20 to 1.1/1, more advantageously from 1/2 to 1.05/1, in terms of the equivalent ratio of active hydrogens to isocyanate groups present in the polyisocyanate. When the active hydrogen/isocyanate group equivalent ratio is 1/1 or more, a resin composition is formed in which all isocyanate groups have been reacted with active hydrogens.

In the reaction, a solvent or a reaction accelerator may be used. As a solvent for the reaction, a solvent inert to an isocyanate group is generally used; however, a solvent capable of reacting with an isocyanate group can also be used as long as the reactivity of the solvent with the isocyanate group is lower than the reactivity of the active hydrogen contained in the hydrolyzable, silicon-containing compound with an isocyanate group.

Examples of reaction accelerators include organometallic compounds, such as dibutyltin dilaurate; and basic compounds, such as amines. The reaction temperature and reaction time for the above-mentioned reaction vary depending on the reactivity of an isocyanate group with the active hydrogen.

A composition for a sealant can be obtained by incorporating into the polyisocyanate of the present invention a filler, a thixotropy-imparting agent, a curing accelerator, a UV absorbent, a light stabilizer, an antioxidant, a peroxide decomposer, a quencher, a metal-deactivating agent, an ozone-deterioration preventing agent, a silane coupling agent, a polymer additive, a dye, a pigment, a flame retardant, or an antistatic agent. In some cases, a solvent or a plasticizer may be incorporated into the polyisocyanate of the present invention.

Examples of fillers include powdery fillers, such as calcium carbonate, fumed silica, precipitated silica, silica acid anhydride, hydrous silica acid, carbon black, magnesium carbonate, diatomite, china clay, kaolin, calcined clay, clay, talc, titanium oxide, bentonite, organic bentonite, ground quartz, glass bead, ferric oxide, zinc oxide, active zinc flower, shirasuballoon, wood meal, pulp, cotton chip, mica, walnut shell flour, rice hull flour, graphite, aluminum fine powder and flint powder; and fibrous fillers, such as glass fiber, glass filament, carbon fiber, Kevlar fiber and polyethylene fiber.

Examples of thixotropy-imparting agents include organic acid-treated calcium carbonate, hydrogenated castor oil, calcium stearate, zinc stearate, silica fine powder, bentonite, silicic acid anhydride and a urea derivative.

Examples of curing accelerators include organotin compounds, such as dibutyltin dilaurate and dioctyltin dilaurate; organozinc compounds, such as zinc octylate; amine compounds, triethylamine, triethylenediamine, laurylamine, morpholine, diazabicycloundecene and diazabicyclooctane: aminosilane compounds, such as 3-aminopropyltrimethoxysilane. These curing accelerators can be used individually or in combination.

Examples of UV absorbents include benzophenone compounds, benzotriazole compounds, oxalic anilide compounds, cyanoacrylate compounds and triazine compounds. Examples of light stabilizers include hindered amine compounds. Examples of antioxidants include phenol compounds, hindered phenol compounds, tioether compounds, phosphorus compounds and amine compounds. Examples of peroxide decomposers include sulfur compounds and phosphorus compounds. Examples of quenchers include organonickel compounds. Examples of metal-deactivating agents include hydrazine compounds. Examples of ozone-deterioration preventing agents include phenylenediamine compounds. These compounds can be used individually or in combination.

Examples of pigments include inorganic pigments, such as iron oxide, chromium oxide and titanium oxide; and organic pigments, such as phthalocyanine blue and phthalocyanine green.

Examples of silane coupling agents include vinyltriethoxysilane, 3-glycideoxypropyltrimethoxysilane, 3-aminopropyltriethoxysilane and 3-mercaptopropyltrimethoxysilane.

Examples of solvents include aromatic hydrocarbons, such as toluene and xylene; aliphatic hydrocarbons, such as hexane, heptane and octane; and petroleum solvents, such as gasoline and kerosene.

Examples of polymer additives include polyethers (such as a polypropylene glycol alkyl ether) having a molecular weight of 500 or more.

Examples of plasticizers include phthalic acid derivatives, such as dibutyl phthalate, dioctyl phthalate, diisononyl phthalate, diisodecyl terephthalate and butyl benzyl phthalate; epoxy plasticizers, such as epoxy soyabean oil, epoxy linseed oil and benzyl epoxy stearate; and polyester plasticizers which are obtained by benzoic acid, trimellitic acid, pyromellitic acid, adipic acid, sebacic acid, fumaric acid, maleic acid, itaconic acid, citric acid or the like. These plasticizers can be used individually or in combination.

The thus obtained composition for a sealant has excellent properties as a one-pack type composition for a sealant.

Further, the use of a polyether polyol as a polyol component for the polyisocyanate of the present invention is advantageous in that when the composition is cured, moisture can easily penetrate into a deep portion of the composition for a sealant due to ether linkages. Of polyols having such an ether linkage, a polyether obtained by adding an active hydrogen-having compound to propylene oxide is especially preferred from a viewpoint of commercial availability.

The polyisocyanate of the present invention can also be used as a composition for a two-pack type sealant. When the polyisocyanate of the present invention is used as a two-pack type composition for a sealant, not only the above-mentioned additive but also an active hydrogen-having compound (such as a polyol) is added to the polyisocyanate of the present invention. Examples of such compounds include compounds generally used for a two-pack type urethane composition for a sealant, such as the above-mentioned polyol and polysulfide having a mercapto group.

The sealant of the present invention can be used as various exterior panels for curtain walls, ceramic siding boards, ALC, concrete and the like; working joints, such as metal furniture fittings; and non-working joints.

The polyisocyanate of the present invention can be used not only for a sealant but also for an adhesive, a self-adhesive, a waterproof material, a floor covering material, a resin, an elastomer, a coating material and the like.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, various properties were measured and evaluated by the following methods.

(1) Allophanate Linkage Content:

20 to 50 mg of a polyisocyanate is dissolved in about 0.5 g of acetone-$d_6$ (($CD_3$)$_2$CO) containing about 100 ppm by weight of tetramethylsilane as a chemical shift standard substance to thereby obtain a sample solution. Using a Fourier transform nuclear magnetic resonance spectrometer (DPX-400, manufactured and sold by Bruker Japan Co., Ltd., Japan), the proton nuclear magnetic resonance ($^1$H-NMR) spectrum of the sample solution is measured to thereby obtain, in the $^1$H-NMR spectrum, a signal ascribed to allophanate linkages (observed in the vicinity of 8.5 ppm) and a signal ascribed to urethane linkages (observed in the vicinity of 6 ppm).

The integral (area) (A) of the signal ascribed to allophanate linkages and the integral (area) (U) of the signal ascribed to urethane linkages are obtained, and the allophanate linkage content is calculated from (A) and (U) values by the following formula:

The allophanate linkage content=(A)/((A)+(U)).

(2) Number Average Molecular Weight:

A sample solution of a polyisocyanate is prepared by dissolving a polyisocyanate in tetrahydrofuran (THF) so that the solution has a polyisocyanate concentration of about 0.25% by weight. The sample solution is subjected to gel permeation chromatography (GPC), and the number average molecular weight of the polyisocyanate is determined using a calibration curve obtained with respect to standard polystyrene samples. The GPC is conducted under the following conditions:

GPC apparatus: HLC-812OGPC (manufactured and sold by TOSOH Corporation, Japan);

Columns: TSKgel Super H5000, TSKgel Super H4000 and TSKgel Super H3000 (each of which is manufactured and sold by TOSOH Corporation, Japan), connected in series;

Carrier: THF (flow rate: 0.6 ml/min);

Detector: refractive index detector; and

Chromatoprocessor: SC-8020 (manufactured and sold by TOSOH Corporation, Japan).

(3) Average Number of Isocyanate Groups:

In the present invention, the term "average number of isocyanate groups" of a polyisocyanate means an average number of isocyanate groups contained in one molecule of the polyisocyanate. The average number of isocyanate groups of a polyisocyanate is obtained by the following formula using the number average molecular weight of the polyisocyanate described in item (2) above and the isocyanate group content of the polyisocyanate described in item (4) below:

The average number of isocyanate groups={(number average molecular weight of a polyisocyanate)×(isocyanate group content)/100)}/42, wherein the value of 42 is the molecular weight of an isocyanate group.

(4) Isocyanate Group Content:

In the present invention, the isocyanate group content of a polyisocyanate is defined as the percent by weight of isocyanate groups in the polyisocyanate, based on the total weight of the polyisocyanate. The isocyanate group content of a polyisocyanate is measured by the following method.

5 to 10 g of a polyisocyanate is accurately weighed and dissolved in 20 ml of toluene. To the resultant solution is added 20 ml of a 2 N solution of n-dibutylamine in toluene. The resultant mixture is allowed to stand at room temperature for 15 minutes to thereby effect a reaction.

After completion of the reaction, the whole amount of the resultant reaction mixture is subjected to back titration by means of an automatic titration apparatus (model APB-410, manufactured and sold by KYOTO DENSHI Co., Ltd., Japan) using 1 N hydrochloric acid. The volume of the hydrochloric acid (titer of sample titration) needed for neutralizing the unreacted n-dibutylamine in the above-mentioned resultant reaction mixture is determined.

Further, the volume of 1 N hydrochloric acid (titer of blank titration) needed for neutralizing the unreacted n-dibutylamine is determined by repeating substantially the same procedure as mentioned above, except that no polyisocyanate is used.

Using the titer of sample titration and the titer of blank titration obtained above, the isocyanate group content is calculated by the following formula:

The content (% by weight) of isocyanate groups={(titer (ml) of blank titration −titer (ml) of sample titration)×42/(the weight (g) of sample×1,000)}×100.

(5) Viscosity:

The viscosity of a polyisocyanate is measured at 25° C. using an E-type viscometer (model VISCONIC ED, manufactured and sold by TOKIMEC Co., Ltd., Japan).

(6) Diisocyanate Monomer Concentration:

A sample solution of a polyisocyanate is subjected to GPC to obtain a chromatogram under substantially the same conditions as described in item (2) above. From the obtained chromatogram, the area of the peak having a retention time corresponding to the molecular weight of the diisocyanate monomer (when the diisocyanate monomer is HDI, the molecular weight is 168) is determined. The percent of the determined peak area, based on the total area of all peaks in the chromatogram, is defined as the diisocyanate monomer concentration (% by weight).

(7) 50% modulus:

A moisture-curable composition containing a polyisocyanate is poured into a die, and allowed to stand at 20° C. and at an RH of 60% for a week to cure the composition, thereby preparing a strip-shaped sample having a width of 10 mm and a thickness of 1 mm. The prepared sample is pulled at a rate of 60 mm/min under conditions wherein the distance between the chucks is 10 mm and the temperature is 20° C. The tensile stress at 50% elongation of the sample is defined as the 50% modulus of the sample.

(8) Tensile elongation and tensile strength:

Samples of a moisture-curable composition containing a polyisocyanate is prepared in substantially the same manner as described in item (7) above. For the measurement of the tensile elongation and the tensile strength of the samples, the samples are pulled at a rate of 60 mm/min under conditions wherein the distance between the chucks is 10 mm and the temperature is 20° C. When the sample is not broken even at an elongation of 1,000%, the tensile stress at 1,000% elongation of the sample is measured.

(9) Curability (evaluation based on a gel ratio)

A moisture-curable composition containing a polyisocyanate is subjected to curing treatment to prepare a sample. The gel ratio of the sample is obtained and used as an index for the evaluation of the curability of the moisture-curable composition. This procedure is described below in detail.

A moisture-curable composition is subjected to curing treatment to prepare a sample in substantially the same manner as in item (7) above, except that the curing time is 24 hours. About 0.5 g of the sample is immersed in 50 g of acetone at 20° C. for 24 hours. The gel ratio is obtained by the following formula from the weights of the sample before and after the immersion of the sample in acetone:

Gel ratio (%)=(the weight of the sample after the immersion of the sample in acetone for 24 hours/the weight of the sample before the immersion)×100.

The gel ratio is evaluated in accordance with the following criteria: when the gel ratio is 90% or more, the curability of the composition is evaluated as ○; and when the gel ratio is less than 90%, the curability of the composition is evaluated as X.

Comparative Example 1

Production of a Polyisocyanate

A four-necked flask provided with a stirrer, a thermometer, a reflux condenser, a nitrogen gas feeding pipe and a dropping funnel was purged with nitrogen gas. Into the flask was charged 600 parts by weight of hexamethylene diisocyanate (HDI) and 1,000 parts by weight of a divalent polyether polyol "Preminol 8000" (manufactured and sold by Asahi Glass Co., Ltd., Japan; number average molecular weight: 8,000; hydroxyl value: 14.1 mg KOH/g), wherein Preminol 8000 is obtained by addition reaction of an active hydrogen-containing compound with propylene oxide. With respect to the mixture of HDI and Preminol 8000, the diisocyanate/polyol ratio was 50/1 in terms of the isocyanate group/hydroxyl group equivalent ratio. The internal temperature of the flask was elevated to 160° C. The mixture in the flask was stirred for 4 hours in a nitrogen atmosphere while maintaining the internal temperature of the flask at 160° C., thereby effecting a reaction. The resultant reaction mixture was transferred to a wiped film evaporator, and the unreacted HDI remaining in the mixture was removed, thereby obtaining a polyisocyanate.

The yield of the polyisocyanate was 67% by weight. With respect to the polyisocyanate, the number average molecular weight was 8,600, the isocyanate group content was 2.02%, the viscosity was 6,400 mPa·s, the diisocyanate monomer concentration was 0.2% by weight, the allophanate linkage content was 0.43, and the average number of isocyanate groups was 4.1. These results are shown in Table 1.

Further, 100 parts by weight of the polyisocyanate obtained above, 100 parts by weight of calcium carbonate (Super SS, manufactured and sold by Maruo Calcium Co., Ltd., Japan) and 0.25 part by weight of dibutyltin dilaurate were mixed by means of a non-bubbling kneader (manufactured and sold by Nihonseiki Kaisha, Ltd., Japan) to thereby obtain a moisture-curable composition. The moisture-curable composition was cured to obtain samples. Using the samples, the 50% modulus, the tensile elongation, the tensile strength and the curability were measured and evaluated. These results are shown in Table 6.

Comparative Example 2

Production of a Polyisocyanate

A polyisocyanate was obtained in substantially the same manner as in Comparative Example 1, except that dibutyltin dilaurate as a catalyst was added to HDI and Preminol 8000, the reaction temperature was 80° C., and the reaction time was 2.5 hours, wherein the amount of dibutyltin dilaurate was 20 ppm by weight, based on the sum of the weights of HDI and Preminol 8000.

The yield of the polyisocyanate was 65% by weight. With respect to the polyisocyanate, the number average molecular weight was 8,300, the isocyanate group content was 1.21%, the viscosity was 5,100 mPa·s, the diisocyanate monomer concentration was 0.2% by weight, the allophanate linkage content was 0.00, and the average number of isocyanate groups was 2.4. These results are shown in Table 1.

Further, 100 parts by weight of the obtained polyisocyanate, 100 parts by weight of calcium carbonate (Super SS, manufactured and sold by Maruo Calcium Co., Ltd., Japan) and 0.25 part by weight of dibutyltin dilaurate were mixed by means of a non-bubbling kneader (manufactured and sold by Nihonseiki Kaisha Ltd., Japan) to thereby obtain a moisture-curable composition. The obtained composition was allowed to stand for a week, but was not cured. Therefore, it was not possible to measure the 50% modulus, the tensile elongation or the tensile strength.

Comparative Example 3

Production of a Polyisocyanate

A polyisocyanate was obtained in substantially the same manner as in Comparative Example 1, except that, instead of Preminol 8000, a divalent polyether polyol "Exenol 3020" (manufactured and sold by Asahi Glass Co., Ltd., Japan; number average molecular weight: 3,200; hydroxyl value: 35 mg KOH/g) was used, wherein Exenol 3020 is obtained by addition-bonding of propylene oxide to an active hydrogen-containing compound and wherein with respect to the mixture of HDI and Exenol 3020, the diisocyanate/polyol ratio was 50/1 in terms of the isocyanate group/hydroxyl group equivalent ratio.

The yield of the polyisocyanate was 45% by weight. With respect to the polyisocyanate, the number average molecular weight was 3,000, the isocyanate group content was 4.29%, the viscosity was 1,200 mPa·s, the diisocyanate monomer concentration was 0.2% by weight, the allophanate linkage content was 0.48, and the average number of isocyanate groups was 3.1. These results are shown in Table 1.

Further, 100 parts by weight of the obtained polyisocyanate, 100 parts by weight of calcium carbonate (Super SS, manufactured and sold by Maruo Calcium Co., Ltd., Japan) and 0.25 part by weight of dibutyltin dilaurate were mixed by means of a non-bubbling kneader (manufactured and sold by Nihonseiki Kaisha, Ltd., Japan) to thereby obtain a moisture-curable composition. The moisture-curable composition was cured to prepare samples. Using the samples, the 50% modulus, the tensile elongation, the tensile strength and the curability were measured and evaluated. These results are shown in Table 6.

EXAMPLE 1

A four-necked flask provided with a stirrer, a thermometer, a reflux condenser, a nitrogen gas feeding pipe and a dropping funnel was purged with nitrogen gas. Into the flask were charged 100 parts by weight of the polyisocyanate (prepared in Comparative Example 1) as a polyisocyanate precursor and 5.8 parts by weight of monohydric alcohol "Newpol LB-285" (polypropylene glycol monoether, manufactured and sold by Sanyo Chemical Ind., Japan; and number average molecular weight: 1,200). With respect to the resultant mixture of the polyisocyanate precursor and Newpol LB-285, the diisocyanate/polyol ratio was 10/1 in terms of the isocyanate group/hydroxyl group equivalent ratio. A reaction was effected by stirring the mixture in a nitrogen atmosphere while maintaining the internal temperature of the flask at 80° C. for 4 hours, thereby obtaining a polyisocyanate.

With respect to the obtained polyisocyanate, the number average molecular weight was 9,100, the isocyanate group content was 1.72%, the viscosity was 9,100 mPa·s, the diisocyanate monomer concentration was 0.2% by weight, the allophanate linkage content was 0.37, and the average number of isocyanate groups was 3.7. These results are shown in Table 3.

Further, 100 parts by weight of the obtained polyisocyanate, 100 parts by weight of calcium carbonate (Super SS, manufactured and sold by Maruo Calcium Co., Ltd., Japan) and 0.25 part by weight of dibutyltin dilaurate were mixed by means of a non-bubbling kneader (manufactured and sold by Nihonseiki Kaisha, Ltd., Japan) to thereby obtain a moisture-curable composition. The moisture-curable composition was cured to prepare samples. Using the samples, the 50% modulus, the tensile elongation, the tensile strength and the curability were measured and evaluated. These results are shown in Table 6.

EXAMPLES 2 TO 4 AND COMPARATIVE EXAMPLE 4

In each of Examples 2 to 4 and Comparative Example 4, a polyisocyanate was obtained in substantially the same manner as in Example 1, except that the types and/or the amounts of monohydric alcohols were changed to those described in Table 2. Table 3 shows the isocyanate group content, the number average molecular weight, the average number of isocyanate groups, the allophanate linkage content and the viscosity of each of the polyisocyanates obtained in Examples 2 to 4 and Comparative Example 4.

Further, in each of Examples 2 to 4 and Comparative Example 4, 100 parts by weight of the obtained polyisocyanate, 100 parts by weight of calcium carbonate (Super SS, manufactured and sold by Maruo Calcium Co., Ltd., Japan) and 0.25 part by weight of dibutyltin dilaurate were mixed by means of a non-bubbling kneader (manufactured and sold by Nihonseiki Kaisha, Ltd., Japan) to thereby obtain a moisture-curable composition. The moisture-curable composition was cured to prepare samples. Using the samples, the 50% modulus, the tensile elongation, the tensile strength and the curability were measured and evaluated. These results are shown in Table 6.

EXAMPLES 5 to 7

In each of Examples 5 to 7, the polyisocyanates obtained in Comparative Examples 1 and 2 were mixed as polyisocyanate components in a ratio described in Table 4 to thereby obtain a polyisocyanate. Table 5 shows the isocyanate group content, the number average molecular weight, the average number of isocyanate groups, the allophanate linkage content and the viscosity of each of the polyisocyanates obtained in Examples 5 to 7.

Further, in each of Examples 5 to 7, 100 parts by weight of the obtained polyisocyanate composition, 100 parts by weight of calcium carbonate (Super SS, manufactured and sold by Maruo Calcium Co., Ltd., Japan) and 0.25 part by weight of dibutyltin dilaurate were mixed by means of a non-bubbling kneader (manufactured and sold by Nihonseiki Kaisha Ltd., Japan) to thereby obtain a moisture-curable composition. The moisturecurable composition was cured to prepared samples. Using the samples, the 50% modulus, the tensile elongation and the curability were measured and evaluated. These results are shown in Table 6.

TABLE 1

|  | Isocyanate group content (%) | Number average molecular weight | Average number of isocyanate groups | Allophanate linkage content | Viscosity (mPa · s; 25° C.) |
| --- | --- | --- | --- | --- | --- |
| Comparative Example 1 | 2.02 | 8,600 | 4.1 | 0.43 | 6,400 |
| Comparative Example 2 | 1.21 | 8,300 | 2.4 | 0.00 | 5,100 |
| Comparative Example 3 | 4.29 | 3,000 | 3.1 | 0.48 | 1,200 |

TABLE 2

|  | Number average molecular weight of monohydric alcohol | Polyisocyanate/monohydric alcohol ratio[1]) |
| --- | --- | --- |
| Example 1 | 1,200 | 10/1 |
| Example 2 | 1,200 | 10/2.5 |
| Example 3 | 2,900 [2]) | 10/1 |
| Example 4 | 2,900 [2]) | 10/2.5 |
| Comparative Example 4 | 1,200 | 10/0.5 |

[1]): The ratio is indicated in terms of the isocyanate group/hydroxyl group equivalent ratio.
[2]): Newpol LB-3000 (polypropylene glycol monoether, manufactured and sold by Sanyo Chemical Ind., Japan; number average molecular weight: 2,900)

TABLE 3

|  | Isocyanate group content (%) | Number average molecular weight | Average number of isocyanate groups | Allophanate linkage content | Viscosity (mPa · s; 25° C.) |
|---|---|---|---|---|---|
| Example 1 | 1.72 | 9,100 | 3.7 | 0.37 | 9,100 |
| Example 2 | 1.33 | 9,800 | 3.1 | 0.28 | 11,000 |
| Example 3 | 1.59 | 9,900 | 3.7 | 0.36 | 15,100 |
| Example 4 | 1.12 | 11,700 | 3.1 | 0.29 | 23,400 |
| Comparative Example 4 | 1.86 | 8,900 | 4.0 | 0.41 | 8,000 |

TABLE 4

| | Ratio of polyisocyanate components (weight ratio) |
|---|---|
| Example 5 | Comparative Example 1/Comparative Example 2 = 1/1 |
| Example 6 | Comparative Example 1/Comparative Example 2 = 1/4 |
| Example 7 | Comparative Example 1/Comparative Example 2 = 1/5 |

Note:
In Table 4, the term "Comparative Example 1" means the polyisocyanate produced in Comparative Example 1, and the term "Comparative Example 2" means the polyisocyanate produced in Comparative Example 2.

TABLE 5

|  | Isocyanate group content (%) | Number average molecular weight | Average number of isocyanate groups | Allophanate linkage content | Viscosity (mPa · s; 25° C.) |
|---|---|---|---|---|---|
| Example 5 | 1.65 | 8,400 | 3.3 | 0.24 | 5,800 |
| Example 6 | 1.37 | 8,400 | 2.7 | 0.13 | 5,400 |
| Example 7 | 1.35 | 8,400 | 2.7 | 0.11 | 5,300 |

TABLE 6

|  | 50% modules (kg/cm²) | Tensile elongation (%) | Tensile strength* (kg/cm²) | Curability |
|---|---|---|---|---|
| Example 1 | 5.5 | >1,000 | 12.3 | ○ |
| Example 2 | 1.2 | >1,000 | 5.5 | ○ |
| Example 3 | 6.2 | 500 | 10.5 | ○ |
| Example 4 | 1.4 | >1,000 | 13.0 | ○ |
| Example 5 | 6.0 | 700 | 13.9 | ○ |
| Example 6 | 3.8 | >1,000 | 11.2 | ○ |
| Example 7 | 3.7 | >1,000 | 9.0 | ○ |
| Comparative Example 1 | 8.6 | 300 | 12.9 | ○ |
| Comparative Example 2 | Could not be measured due to incurability | | | x |
| Comparative Example 3 | 7.5 | 50 | 7.5 | ○ |
| Comparative Example 4 | 8.0 | 350 | 12.0 | ○ |

*When the sample was not broken even at an elongation of 1,000%, the tensile stress at 1,000% elongation of the sample was measured.

INDUSTRIAL APPLICABILITY

The novel polyisocyanate of the present invention exhibits a high curing rate and a low viscosity. Further, the polyisocyanate, upon being cured, not only has no surface tack and exhibits a low modulus-in-tension property, but also exhibits a high tensile elongation property without a need for a plasticizer. Therefore, the polyisocyanate can be advantageously used not only as a sealant but also as an adhesive, a self-adhesive, a waterproof material, a floor covering material, a resin, an elastomer, a coating material and the like. Also, by the method of the present invention, the polyisocyanate which, upon being cured, is improved with respect to a low modulus-in-tension property and a high tension elongation property can be effectively and efficiently produced.

What is claimed is:

1. A method for producing a polyisocyanate which, upon being cured, is improved with respect to a low modulus-in-tension property and a high tensile elongation property, said method comprising:
   (i) reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3, in a diisocyanate/polyol ratio of from 5/1 to 100/1 in terms of the isocyanate group/hydroxyl group equivalent ratio, to thereby obtain a polyisocyanate precursor having an allophanate linkage content of 0.10 or more, in terms of the ratio of the number of allophanate linkages in said polyisocyanate precursor to the sum of the number of the allophanate linkages in said polyisocyanate precursor and the number of urethane linkages in said polyisocyanate precursor, and having an isocyanate group content of from 0.05 to 10% by weight;
   (ii) removing substantially all unreacted diisocyanate monomers; and
   (iii) subjecting said polyisocyanate precursor to an addition reaction with a monohydric alcohol to an extent that a polyisocyanate having an average number of isocyanate groups of not less than 2 is obtained.

2. The method according to claim 1, wherein said polyisocyanate is for use as sealant.

3. The method according to claim 2, wherein said sealant is free of a plasticizer.

4. A method for producing a sealant, which comprises producing a polyisocyanate by the method of claim 1, and incorporating an additive into said polyisocyanate to thereby produce a sealant.

5. The method according to claim 4, wherein said sealant is free of a plasticizer.

6. A method for producing a polyisocyanate which, upon being cured, is improved with respect to a low modulus-in-tension property and a high tensile elongation property, said method comprising:
   (i) providing the following polyisocyanates (A) and (B):
      (A) a polyisocyanate having an allophanate linkage content of 0.10 or more, in terms of the ratio of the number of allophanate linkages in said polyisocyanate (A) to the sum of the number of the allophanate linkages in said polyisocyanate (A) and the number of urethane linkages in said polyisocyanate (A), and having an isocyanate group content of from 0.05 to 10% by weight,
         said polyisocyanate (A) being prepared by reacting at least one diisocyanate selected from the group consisting of an aliphatic diisocyanate and an alicyclic diisocyanate with a polyol having a number average molecular weight of from 3,000 to 30,000 and an average number of hydroxyl groups of from 2 to 3, in a diisocyanate/polyol ratio of from 5/1 to 100/1 in terms of the isocyanate group/hydroxyl group equivalent ratio, and (B) a polyisocyanate having a number average molecular weight of from 1,000 to 30,000 and an allophanate linkage content of less than 0.05, in terms of the ratio of the number of allophanate linkages in said polyisocyanate (B) to the sum of the number of the allophanate linkages in said polyisocyanate (B) and the number of urethane linkages in said polyisocyanate (B), and having an average number of isocyanate groups of from 1.5 to 2.5, said polyisocyanate (B) being prepared by reacting at least one diisocyanate selected from the group consisting of an aliphatic diisocyanate and an alicyclic diisocyanate with a polyol, and removing substantially all unreacted diisocyanate monomers; and (ii) mixing said polyisocyanates (A) and (B) in an (A)/(B) weight ratio of from 5/1 to 1/10.

7. The method according to claim 6, wherein said polyisocyanate is for use as a sealant.

8. The method according to claim 7, wherein said sealant is free of a plasticizer.

9. A method for producing a sealant, which comprises producing a polyisocyarate by the method of claim 6, and incorporating an additive into said polyisocyanate to thereby produce a sealant.

10. The method according to claim 9, wherein said sealant is free of a plasticizer.

* * * * *